United States Patent
Aposhian et al.

(10) Patent No.: US 9,258,937 B2
(45) Date of Patent: Feb. 16, 2016

(54) SOD HARVESTER STACKING HEAD THAT IS MOVABLE WITH A STACKING CONVEYOR

(71) Applicants: Steven R. Aposhian, Farmington, UT (US); Eric E. Aston, Salt Lake City, UT (US); William M. Decker, Salt Lake City, UT (US); Samuel Drake, Cottonwood Heights, UT (US)

(72) Inventors: Steven R. Aposhian, Farmington, UT (US); Eric E. Aston, Salt Lake City, UT (US); William M. Decker, Salt Lake City, UT (US); Samuel Drake, Cottonwood Heights, UT (US)

(73) Assignee: Firefly Automatix, Inc., North Salt Lake City, UT (US)

( * ) Notice: Subject to any disclaimer, the term of this patent is extended or adjusted under 35 U.S.C. 154(b) by 30 days.

(21) Appl. No.: 14/302,222

(22) Filed: Jun. 11, 2014

(65) Prior Publication Data

US 2015/0359160 A1 Dec. 17, 2015

(51) Int. Cl.
*B65B 23/00* (2006.01)
*A01B 45/04* (2006.01)
*B25J 9/16* (2006.01)
*B65G 43/08* (2006.01)
*B65B 23/14* (2006.01)
*B65B 35/50* (2006.01)

(52) U.S. Cl.
CPC .............. *A01B 45/045* (2013.01); *A01B 45/04* (2013.01); *B25J 9/1676* (2013.01); *B65B 23/14* (2013.01); *B65B 35/50* (2013.01); *B65G 43/08* (2013.01); *B65G 2201/0205* (2013.01); *B65G 2203/044* (2013.01); *Y10S 414/124* (2013.01)

(58) Field of Classification Search
CPC ........ B65B 5/105; B65B 21/06; B65B 21/12; B25J 9/0093; B25J 9/0084; B65G 47/917; B65G 61/00; B65G 2203/042; B65G 2203/044; B65G 43/08; B65G 47/90; B65G 47/918
USPC ............. 172/19, 20; 198/468.2, 468.4, 789.7, 198/791.4, 791.6, 792, 792.6; 53/244, 247, 53/251, 499, 534; 700/230; 901/7
See application file for complete search history.

(56) References Cited

U.S. PATENT DOCUMENTS

| | | | | |
|---|---|---|---|---|
| 4,991,708 | A * | 2/1991 | Francioni | B65G 43/08 198/419.2 |
| 5,105,606 | A * | 4/1992 | Creed | B65B 5/105 53/251 |
| 5,263,813 | A * | 11/1993 | Kiederle | B65G 47/90 294/67.31 |
| 6,122,895 | A * | 9/2000 | Schubert | B65B 5/12 53/240 |
| 6,364,027 | B1 * | 4/2002 | Tvetene | A01B 45/045 172/1 |
| 7,644,558 | B1 * | 1/2010 | Fallas | B25J 9/0093 53/251 |
| 7,762,382 | B2 * | 7/2010 | Grundtvig | B65G 47/682 198/382 |
| 2006/0099064 | A1 * | 5/2006 | Anaki | B25J 9/0084 414/797 |
| 2011/0154784 | A1 * | 6/2011 | Poutot | B65B 5/024 53/443 |

* cited by examiner

*Primary Examiner* — Gregory Adams
(74) *Attorney, Agent, or Firm* — Brian Tucker; Kirton McConkie

(57) ABSTRACT

A stacking head of a sod harvester can be configured to move with a stacking conveyor during a pick up operation. A stacking head on a roll harvester can be configured to move with a stacking conveyor to allow the stacking conveyor to be moved while the stacking head is removing rolls of sod from the stacking conveyor.

20 Claims, 8 Drawing Sheets

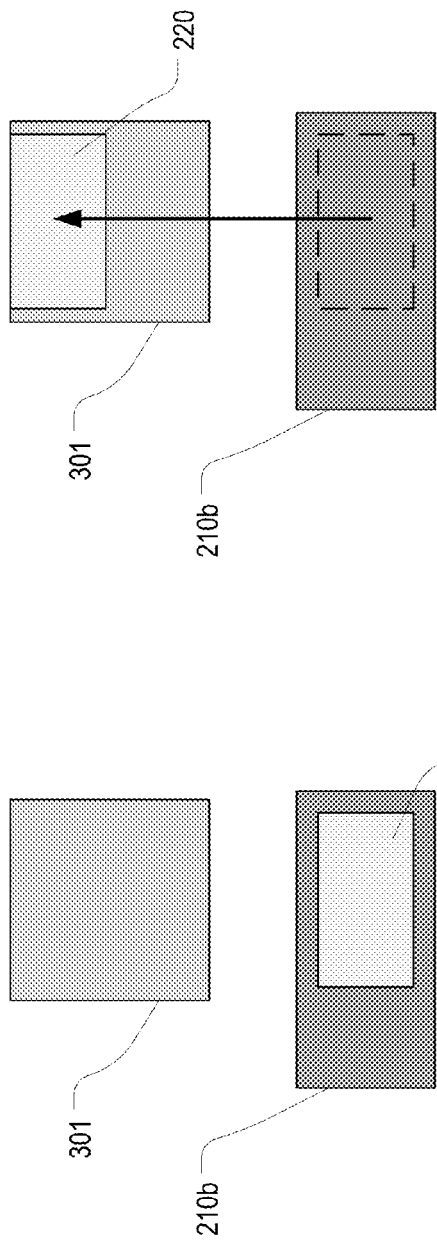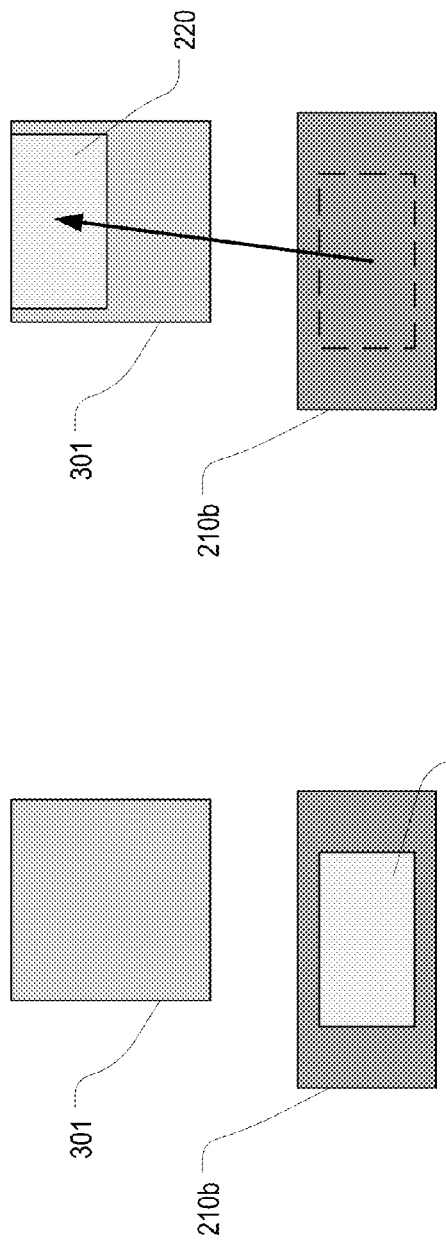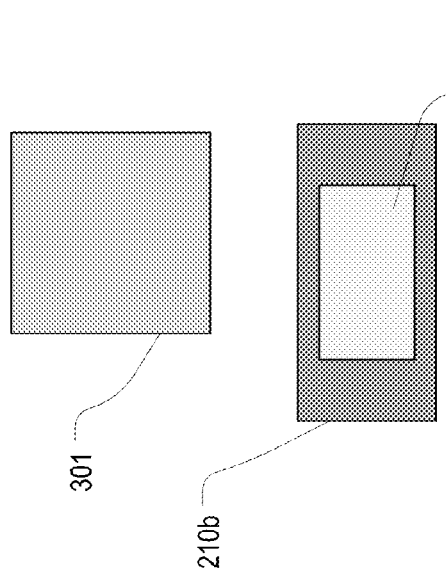

SOD HARVESTER STACKING HEAD THAT IS MOVABLE WITH A STACKING CONVEYOR

CROSS-REFERENCE TO RELATED APPLICATIONS

This application is related to U.S. patent application Ser. No. 13/851,418 (the '418 application), titled Electrically Operated Turf Stacking System For Sod Harvesting Machine, which was filed on Mar. 27, 2013 and is incorporated herein by reference. The '418 application describes a stacking head that is suitable for use in implementing some embodiments of the present invention.

This application is also related to U.S. patent application Ser. No. 13/851,402 (the '402 application), titled Conveyor System For Controlling Spacing Between Sod Slabs, which was filed on Mar. 27, 2013 and is incorporated herein by reference. The '402 application describes a conveyor system that can be used in some embodiments of the present invention.

BACKGROUND

Turf grass (sod) is a living organism that must be handled properly to ensure its survival when it is removed from one location and transplanted to another. Sod is generally harvested using large machinery that cuts slabs of sod from the soil. Typically, a sod harvester employs one or more inclined conveyors to elevate the sod from the ground to a horizontal conveyor. A stacking head is then used to pick up the sod from the horizontal conveyor and stack it on a pallet.

Two general types of harvesters exist: slab harvesters; and roll harvesters. A roll harvester forms the slabs of sod into rolls which are then accumulated on the horizontal conveyor for pick up. A slab harvester, on the other hand, directly stacks the slabs in their flat form. With either type of harvester, the speed at which the harvester can remove sod from the horizontal conveyor and stack it oftentimes is the controlling factor that determines how fast the harvester can operate.

FIGS. 1A-1C illustrate an example of a portion of a prior art roll harvester 100. Roll harvester 100 includes a cutting head comprised of a first blade 111, a second blade 112, and a roller 113. Blade 111 is periodically lowered into the sod to make vertical cuts defining the length of the slabs. Blade 112 oscillates back and forth underneath the sod to sever the slab from the underlying soil 101. Roller 113 applies pressure to the sod as it is cut to facilitate the cutting of clean slabs.

Slabs cut by the cutting head are routed to conveyor 110a which lifts the slabs up towards conveyor 110b. A rolling mechanism 130 is positioned above conveyor 110a and causes the front edge of slabs 102 to be rolled backwards as the slabs advance towards conveyor 110b. The completed rolls 102 are then advanced onto conveyor 110b where they are accumulated until a sufficient number of rolls are present on the conveyor.

FIG. 1A illustrates the instance where four rolls have been accumulated on conveyor 110b. As best shown in FIG. 1B, a stacking head 120 is positioned above conveyor 110b and is designed to pick up four rolls of sod when five rolls of sod are present on conveyor 110b. The use of four and five rolls in this example is entirely arbitrary. This example would be equally applicable if stacking head 120 were configured to pick up any other number of rolls when any other number of rolls was present on conveyor 110b. For example, stacking head 120 could be positioned to the right of what is shown in FIGS. 1A-1C to allow it to pick up four rolls when four rolls were present on conveyor 110b. Similarly, if a longer conveyor were used, stacking head 120 could be configured to pick up four rolls when seven rolls were present on conveyor 110b, or stacking head 120 could be wider to pick up five rolls when six rolls were present on conveyor 110b.

As shown in FIG. 1B, once the proper number of rolls (e.g. four) is positioned underneath stacking head 120, stacking head 120 descends to pick up the rolls. Stacking head 120 can include various mechanisms for picking up the rolls, but the specific mechanism is not important to the present invention. Of importance is the amount of time required to pick up the rolls. Specifically, once conveyor 110b is advanced so that four rolls are positioned underneath stacking head 120, conveyor 110b cannot be advanced again until stacking head 120 has lifted the four rolls from conveyor 110b. For example, if conveyor 110b were advanced prior to stacking head 120 securing the rolls (e.g. by clamping or piercing the rolls), the leftmost roll would fall off conveyor 110b. Also, if conveyor 110b were advanced while stacking head 120 has secured the rolls but prior to lifting them, the rolls could be ripped or otherwise damaged as conveyor 110b pulls the rolls away from stacking head 120.

At the same time, if a subsequent roll (e.g. one on conveyor 110a) has been completed and needs to be advanced onto conveyor 110b, but stacking head 120 has not yet picked up the rolls, the harvester will be forced to temporarily stop to wait until conveyor 110b can be advanced to make room for the subsequent roll. In other words, if a newly formed roll on conveyor 110a cannot be advanced to conveyor 110b, the harvester will need to stop (or at least slow down) so that a new slab does not advance into roll mechanism 130. Otherwise, if the harvester is not slowed or stopped, the rolls would jam together clogging conveyor 110b.

FIG. 1C represents the case where stacking head 120 has descended to pick up the rolls, but has not yet secured them or lifted them from conveyor 110b. Also, FIG. 1C shows that a roll 102a is ready to be advanced onto conveyor 110b while a new slab 102b is advancing up conveyor 110a. FIG. 1C therefore represents one case when harvester 100 will have to stop to wait for stacking head 120 to pick up the rolls. Specifically, because slab 102b will continue to advance towards roll mechanism 130 as long as harvester 100 continues moving forward (or as long as inclined conveyor 110a continues to rotate), but roll mechanism is not ready to receive slab 102b because roll 102a cannot be advanced onto conveyor 110b, harvester 100 will have to temporarily stop until stacking head 120 has removed the rolls thereby allowing conveyor 110b to be advanced to receive roll 102a.

BRIEF SUMMARY

The present invention extends to a stacking head of a sod harvester that is movable with a stacking conveyor as well as to systems, methods, and computer program products configured to implement such movement. A movable stacking head can be employed on a roll harvester as well as on a slab harvester.

A stacking head can be moved in accordance with the present invention for various reasons. For example, a stacking head on a sod harvester can be configured to move with a stacking conveyor to allow the stacking conveyor to be moved during a pick up operation to make room on the stacking conveyor for a subsequent slab or roll or to otherwise allow a subsequent slab or roll to be advanced onto the stacking conveyor.

In one embodiment, the present invention is implemented as a sod harvester. The sod harvester includes a stacking conveyor configured to support one or more slabs of sod prior to a pick up operation. The stacking conveyor is configured to rotate in a first direction to advance the one or more slabs of sod onto the stacking conveyor. The sod harvester also includes a stacking head configured to remove the one or more slabs of sod from the stacking conveyor as part of a pick up operation. The stacking head is configured to move in the first direction during the pick up operation.

In another embodiment, the present invention is implemented as a system for moving a stacking head with a stacking conveyor during a pick up operation. The system includes circuitry for controlling movement of the stacking conveyor in a first direction. The stacking conveyor is configured to move in the first direction to advance one or more slabs of sod onto the stacking conveyor. The system also includes circuitry for causing the stacking head to move in the first direction based on movement of the stacking conveyor in the first direction.

In another embodiment, the present invention is implemented as a sod harvester that includes one or more inclined conveyors for elevating slabs of sod to a stacking conveyor; a roll mechanism for converting the slabs of sod into rolls; the stacking conveyor on which a plurality of rolls are accumulated for pick up, the stacking conveyor being configured to advance a specified distance to receive a roll from the one or more inclined conveyors; and the stacking head. The stacking head is configured to pick up a plurality of rolls from the stacking conveyor when the stacking head is in a first position as well as when the stacking head is in a second position. The stacking head moves from the first position to the second position when the stacking conveyor advances the specified distance.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 3A-3D illustrate various movements that the stacking head of the example sod harvester can make while picking up rolls of sod from the stacking conveyor and stacking the rolls on a pallet.

DETAILED DESCRIPTION

Figure 1A:
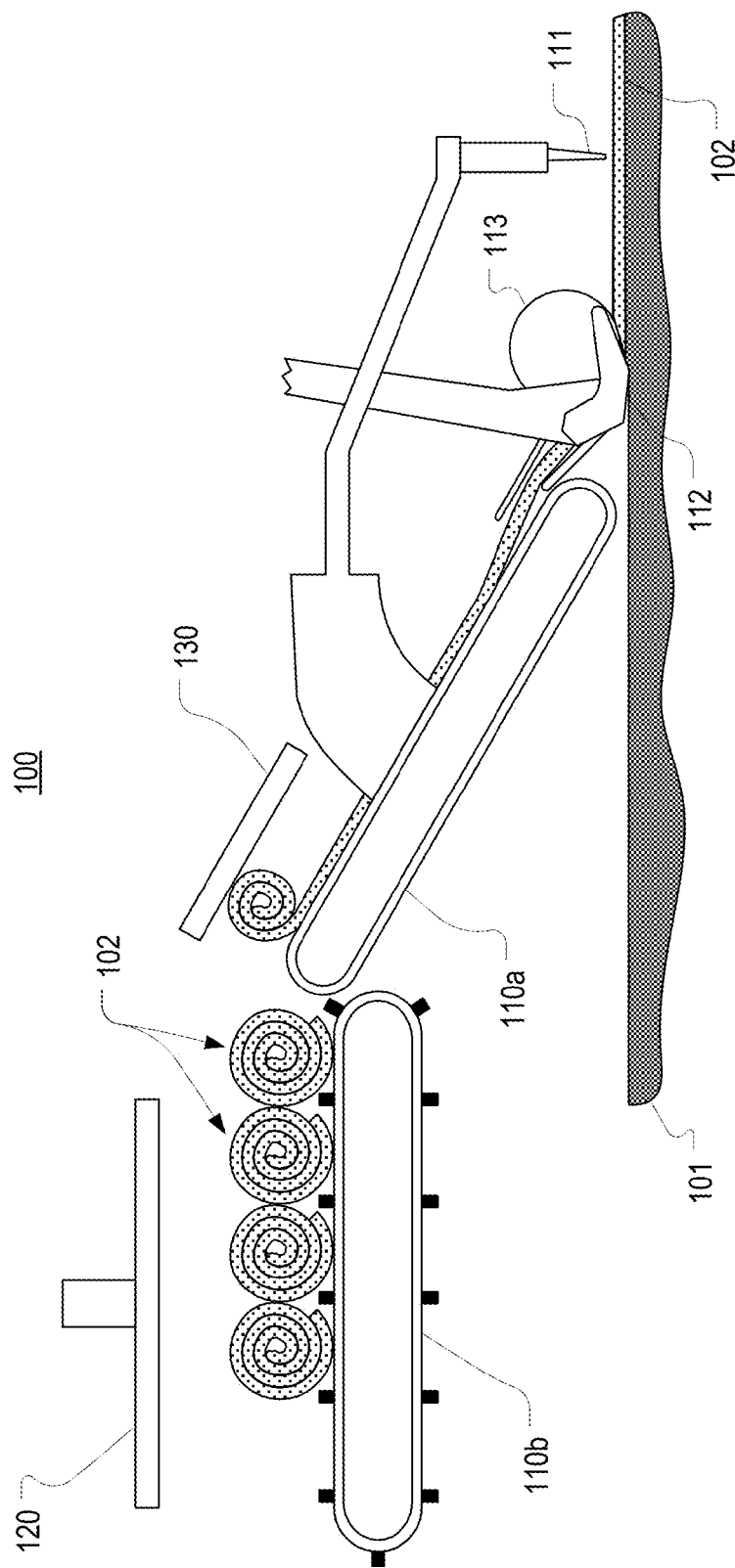
FIGS. 1A-1C illustrate a portion of a prior art sod harvester that accumulates rolls of sod on a stacking conveyor prior to the rolls being picked up by a stacking head for stacking. The stacking head of the prior art sod harvester does not move with the stacking conveyor.

The present invention extends to a stacking head of a sod harvester that is movable with a stacking conveyor as well as to systems, methods, and computer program products configured to implement such movement. A movable stacking head can be employed on a roll harvester as well as on a slab harvester.

A stacking head can be moved in accordance with the present invention for various reasons. For example, a stacking head on a sod harvester can be configured to move with a stacking conveyor to allow the stacking conveyor to be moved during a pick up operation to make room on the stacking conveyor for a subsequent slab or roll or to otherwise allow a subsequent slab or roll to be advanced onto the stacking conveyor.

In one embodiment, the present invention is implemented as a sod harvester. The sod harvester includes a stacking conveyor configured to support one or more slabs of sod prior to a pick up operation. The stacking conveyor is configured to rotate in a first direction to advance the one or more slabs of sod onto the stacking conveyor. The sod harvester also includes a stacking head configured to remove the one or more slabs of sod from the stacking conveyor as part of a pick up operation. The stacking head is configured to move in the first direction during the pick up operation.

In another embodiment, the present invention is implemented as a system for moving a stacking head with a stacking conveyor during a pick up operation. The system includes circuitry for controlling movement of the stacking conveyor in a first direction. The stacking conveyor is configured to move in the first direction to advance one or more slabs of sod onto the stacking conveyor. The system also includes circuitry for causing the stacking head to move in the first direction based on movement of the stacking conveyor in the first direction.

In another embodiment, the present invention is implemented as a sod harvester that includes one or more inclined conveyors for elevating slabs of sod to a stacking conveyor; a roll mechanism for converting the slabs of sod into rolls; the stacking conveyor on which a plurality of rolls are accumulated for pick up, the stacking conveyor being configured to advance a specified distance to receive a roll from the one or more inclined conveyors; and the stacking head. The stacking head is configured to pick up a plurality of rolls from the stacking conveyor when the stacking head is in a first position as well as when the stacking head is in a second position. The stacking head moves from the first position to the second position when the stacking conveyor advances the specified distance.

In this specification, a stacking head refers to the mechanism of a sod harvester that picks up sod and stacks it, whether the sod is in slabs or in rolls. The manner in which the stacking head picks up the sod is not essential to the invention. For example, the stacking head may descend to a stacking conveyor to pick up the sod, or the stacking conveyor may be lifted to elevate the sod towards the stacking head. Further, in some implementations, the stacking head may descend and the stacking conveyor may be lifted.

Also, in this specification, a stacking head can employ many different types of structures and/or techniques for securing the sod. For example, a stacking head can include pivoting clamps that grab the sod (e.g. on opposite sides of a roll or by squeezing the blades of a slab), extending blades or sharp implements that pierce through the sod (e.g. nails that extend into opposing sides of a roll or that extend through slabs at an angle), etc. Accordingly, a stacking head should not be construed as having any particular structure for securing sod to the stacking head during a pick up operation.

Further, in this specification, a stacking conveyor should be construed as any conveyor from which the stacking head picks up sod whether the sod is in slabs or in rolls. Although the figures illustrate a stacking conveyor that is horizontal, a stacking conveyor should also be construed as including conveyors that are inclined in any direction as long as the stacking head removes sod from the conveyor as part of a pick up operation.

Figure 1B:
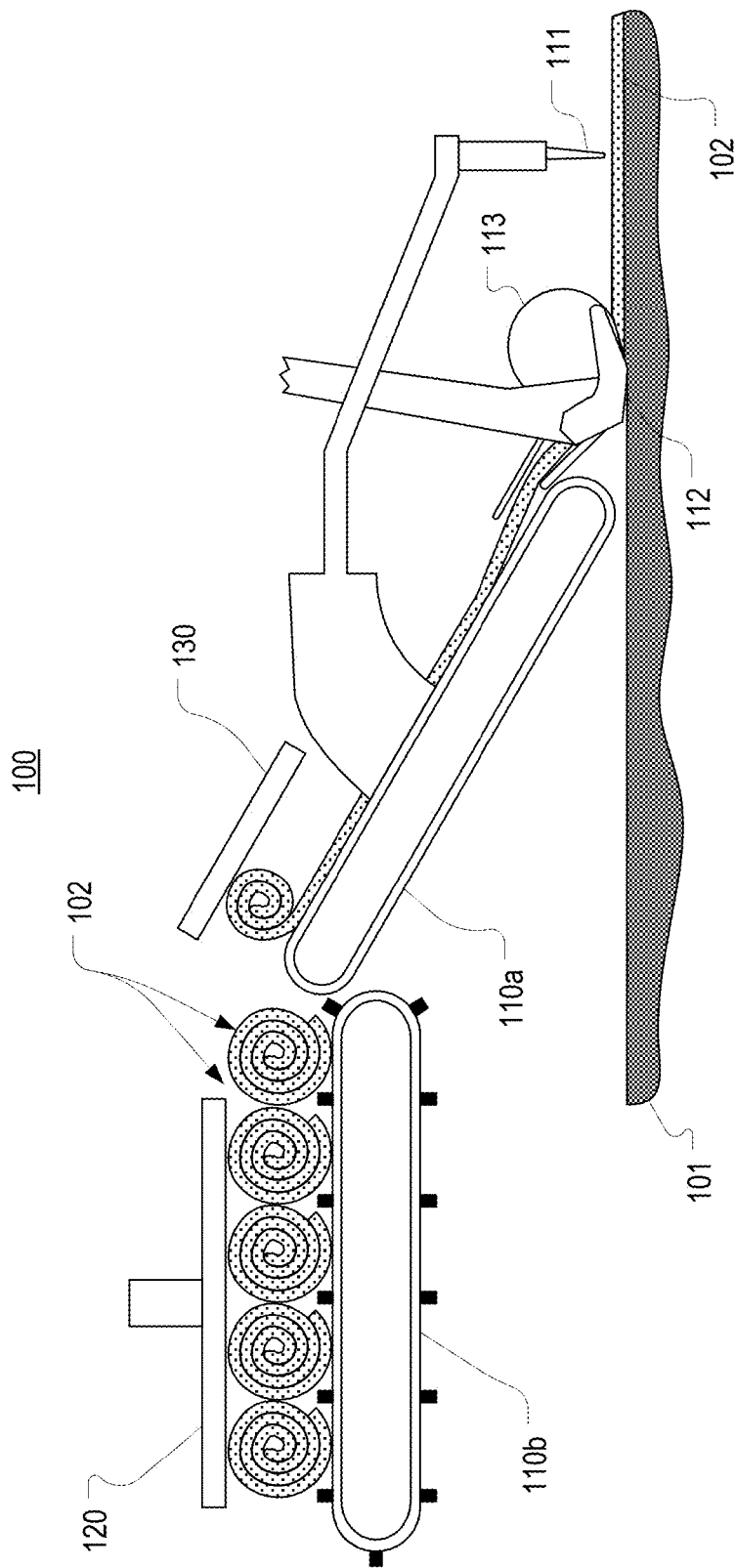
Figure 1C:
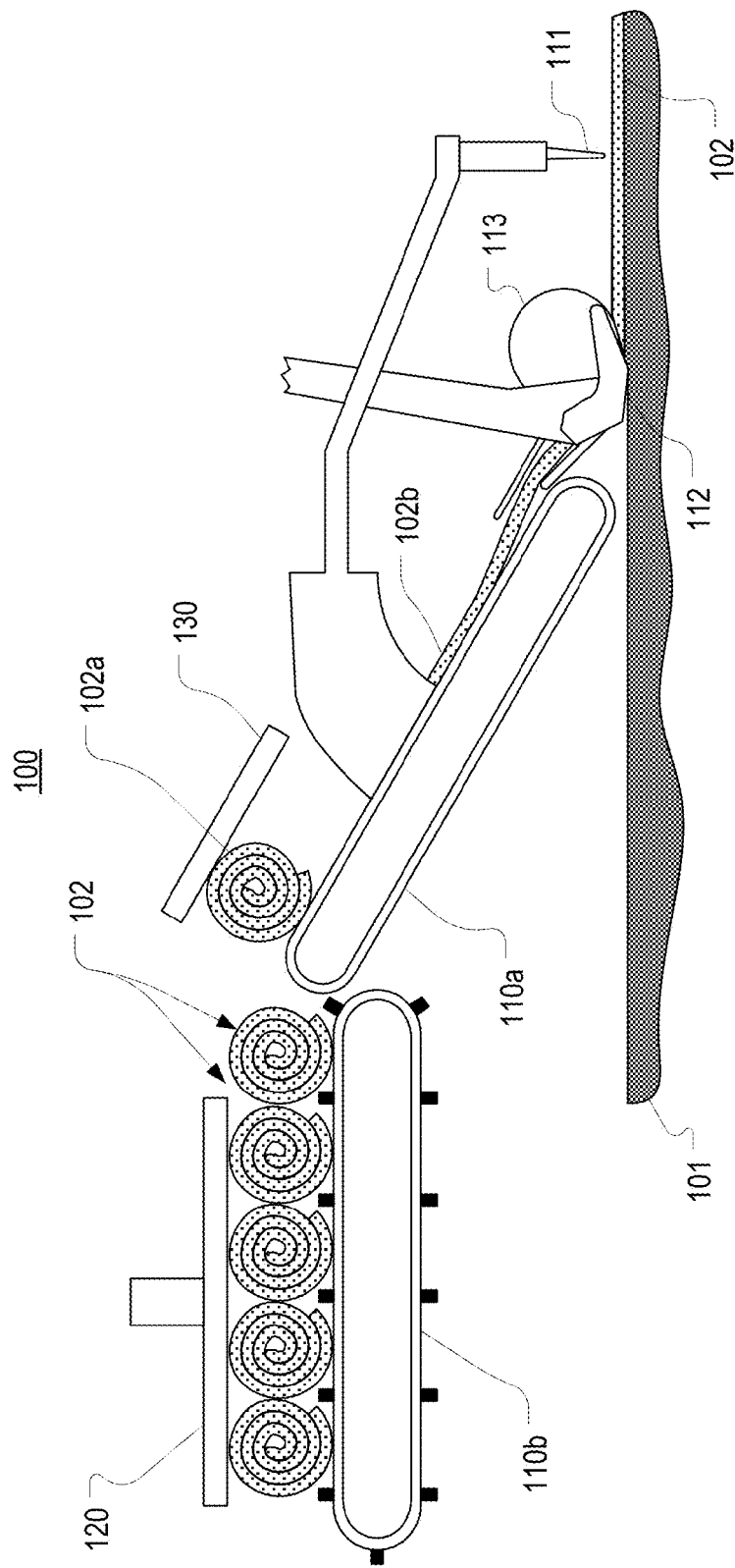

FIGS. 2A-2D illustrate a portion of an example sod harvester 200 configured in accordance with one or more embodiments of the present invention. Sod harvester 200 includes an inclined conveyor 210a that delivers slabs of sod up to a stacking conveyor 210b. Although not shown, inclined conveyor 210a typically receives sod as the sod is cut from the ground such as is shown in FIGS. 1A-1C. Further, although inclined conveyor 210a is shown as a single conveyor, multiple inclined conveyors can be used to elevate sod to stacking conveyor 210b. Therefore, the present invention should not be limited by any particular way in which sod is elevated to stacking conveyor 210b.

A roll mechanism 230 is positioned above inclined conveyor 210a so as to form each slab of sod into a roll 202. Roll mechanism 230 is represented generically as a rectangle to indicate that any suitable type of roll mechanism could be employed to form rolls 202. For example, roll mechanism 230 need not be positioned directly over inclined conveyor 210a, but may comprise components on opposite sides of inclined conveyor 210a. A typical configuration of roll mechanism 230 includes means for causing the front edge of a slab of sod to be rolled (or folded) backwards so that, as the slab continues to advance forward on inclined conveyor 210a, the slab is caused to roll backwards as shown in the figures. As an example, this means for causing the rolling of the slabs can be one or more conveyors on roll mechanism 230 that rotate in a direction generally opposite the rotational direction of inclined conveyor 210a.

Stacking head 220 is an example of a stacking head that picks up and stacks four rolls of sod at a time. A stacking head in accordance with the present invention may equally be configured to pick up and stack a different number of rolls at a time (e.g. five rolls). Also, although the figures illustrate that a single row of rolls in formed and picked up, it is equally possible that multiple rows may be formed and picked up in parallel by a stacking head. For example, stacking head 220 could be configured to pick up two rows of four rolls for a total of eight rolls at a time, or two rows of five rolls for a total of ten rolls at a time.

Figure 2A:
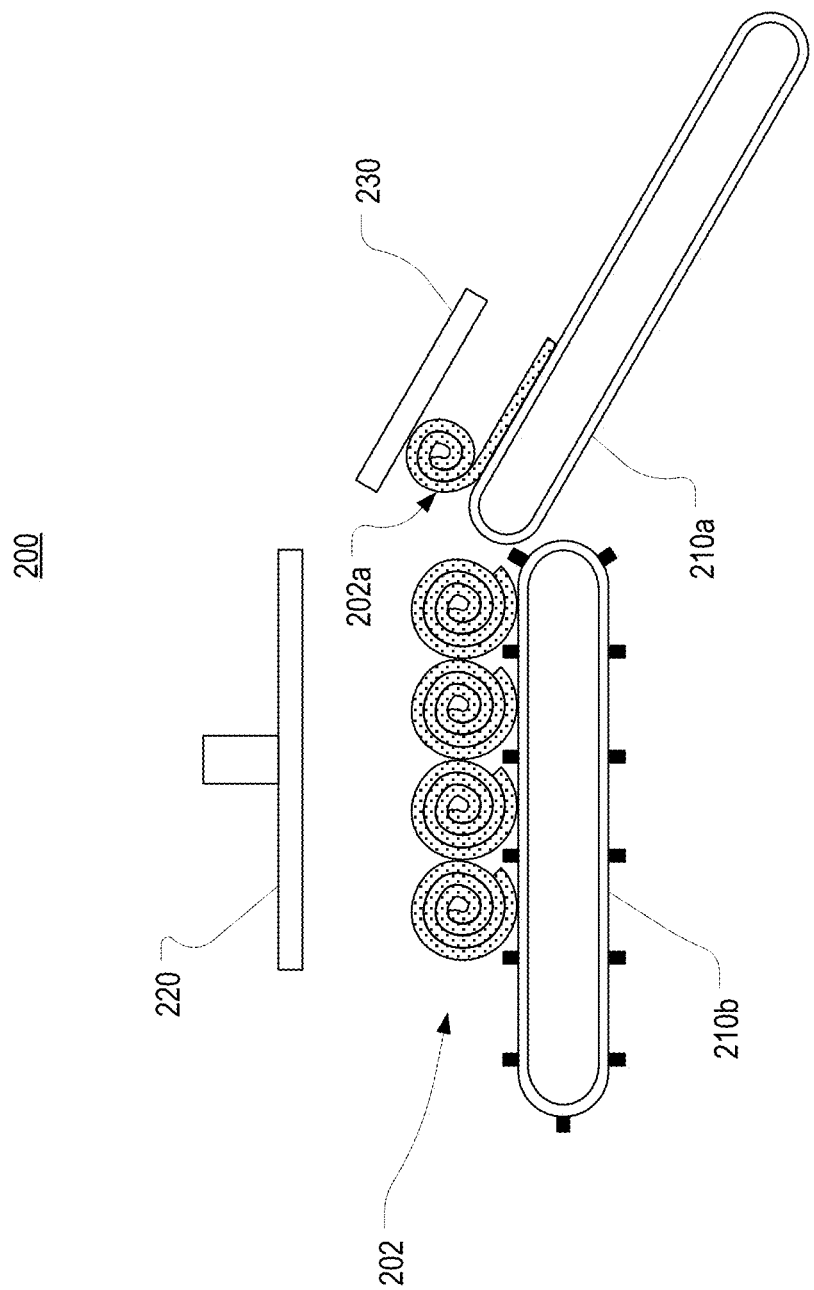
FIGS. 2A-2D illustrate a portion of an example sod harvester configured in accordance with one or more embodiments of the present invention. The example sod harvester also accumulates rolls of sod on a stacking conveyor prior to the rolls being picked up by a stacking head for stacking. The stacking head of the example sod harvester is configured to move with the stacking conveyor prior to or during a pick up operation.

FIG. 2A represents an instance during sod harvesting when four rolls 202 have been formed and are appropriately positioned on stacking conveyor 210b for pick up and stacking. In some instances, stacking head 220 can descend (or alternatively, stacking conveyor 210b can be lifted) to allow stacking head 220 to secure the rolls 202 for pick up. In the remainder of this specification, the stacking head will be described as descending to pick up and remove the sod from the stacking conveyor. However, it is to be understood that, in each of the embodiments, the stacking head could alternatively remain at a constant elevation while the stacking conveyor is lifted towards the stacking head, or that both the stacking head and the stacking conveyor could be moved towards each other.

Once stacking head 220 has secured the four rolls 202, stacking head 220 can lift the rolls from stacking conveyor 210b and transport the rolls for stacking on a pallet. As soon as the rolls are removed from stacking conveyor 210b, stacking conveyor 210b can be advanced to make room for the next roll 202a. In some instances, this pick up operation can be completed quickly enough that stacking conveyor 210b can be advanced prior to the time when the next roll 202a needs to be advanced from inclined conveyor 210a to stacking conveyor 210b.

Figure 2B:
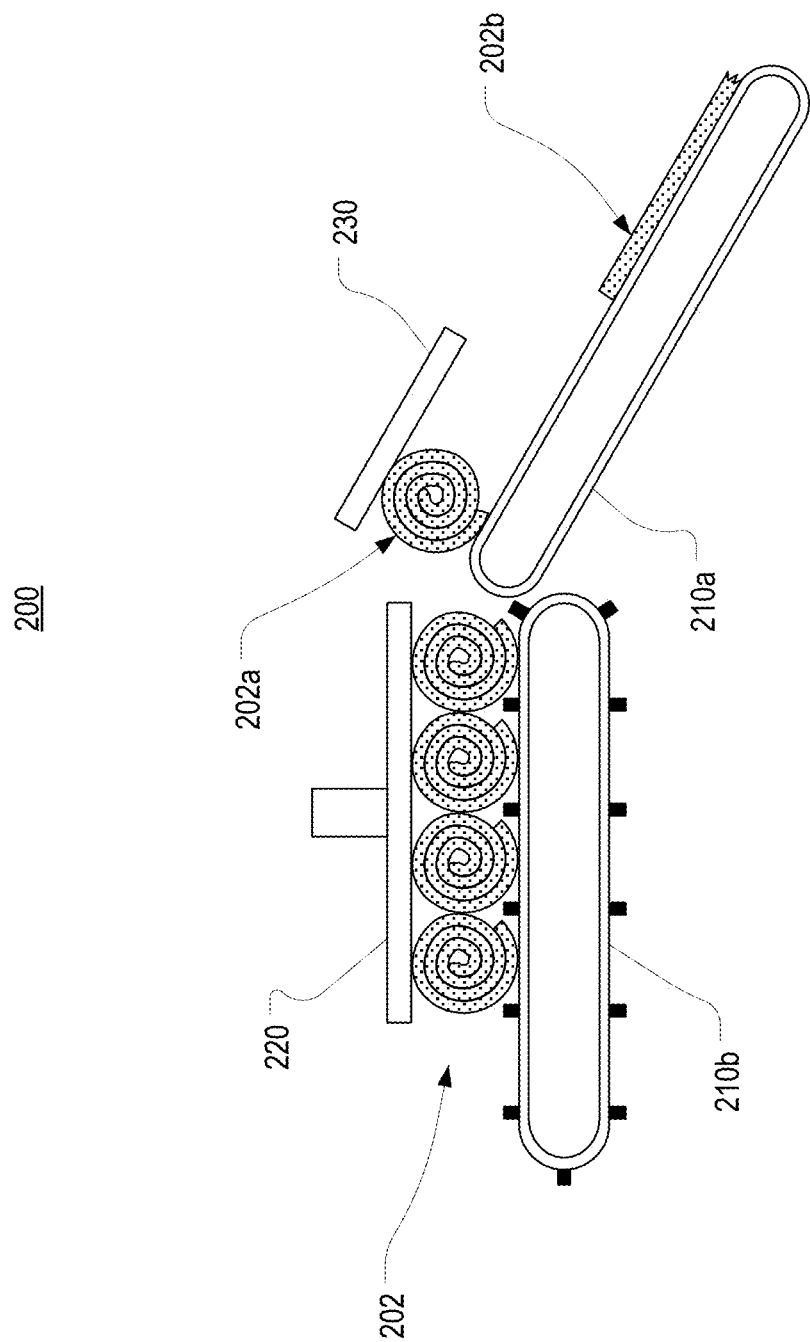

However, in other instances, the four rolls 202 may not be removed from stacking conveyor 210b before the next roll 202a needs to be advanced onto stacking conveyor 210b. FIG. 2B represents one example of such an instance. As shown, a subsequent slab 202b is being advanced along inclined conveyor 202b. However, the next roll 202a is still on inclined conveyor 210a (or otherwise within roll mechanism 230) because stacking conveyor 210b has not been advanced to make room for the next roll 202a. As described in the Background, in such instances, prior art sod harvesters would temporarily stop (or at least slow down) so that the inclined conveyor (whose rotation is typically tied to the ground speed of the sod harvester) would stop thereby preventing the subsequent slab from reaching the roll mechanism before the roll mechanism is ready to receive it. These prior art sod harvesters (or at least the inclined conveyor on such harvesters) would remain stopped until the stacking mechanism has picked up the sod from the stacking conveyor to allow the stacking conveyor to be advanced.

Figure 2C:
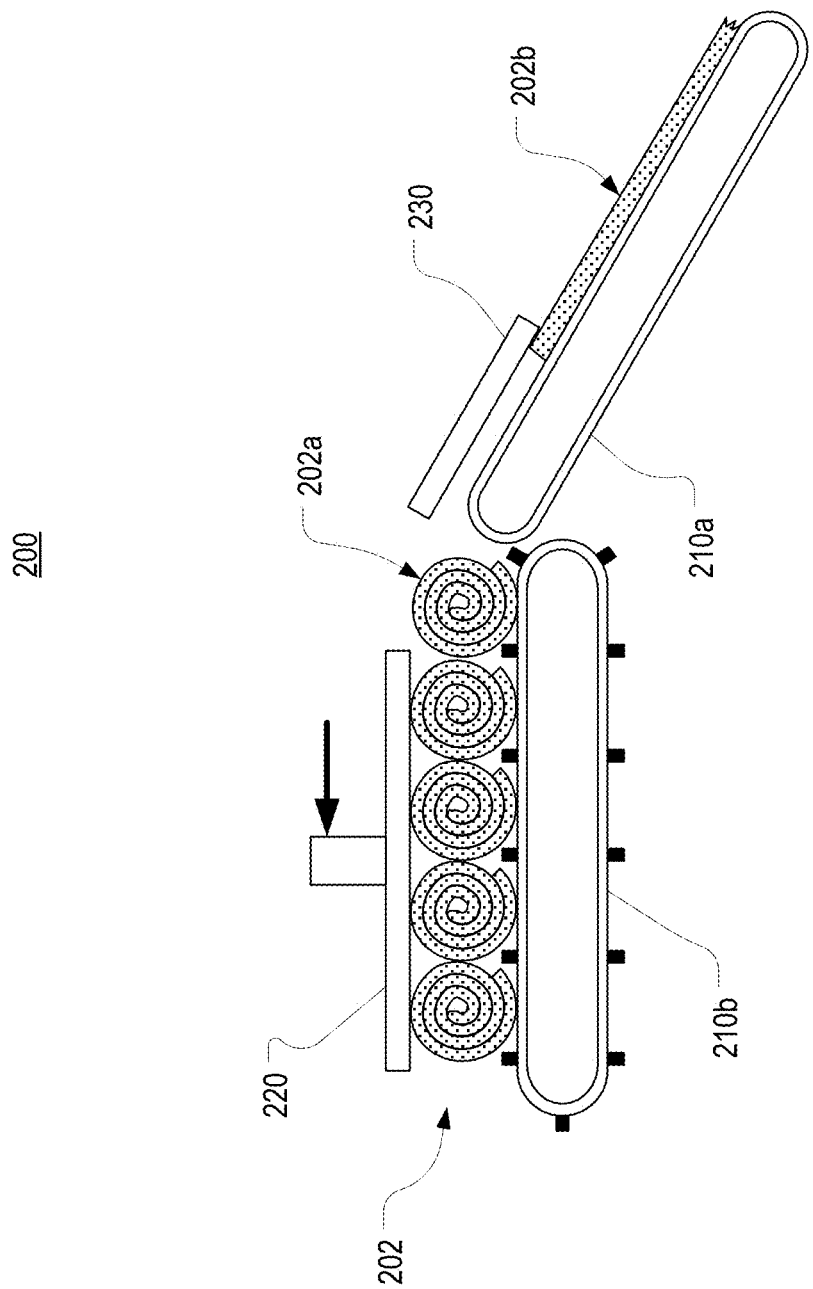
Figure 2D:
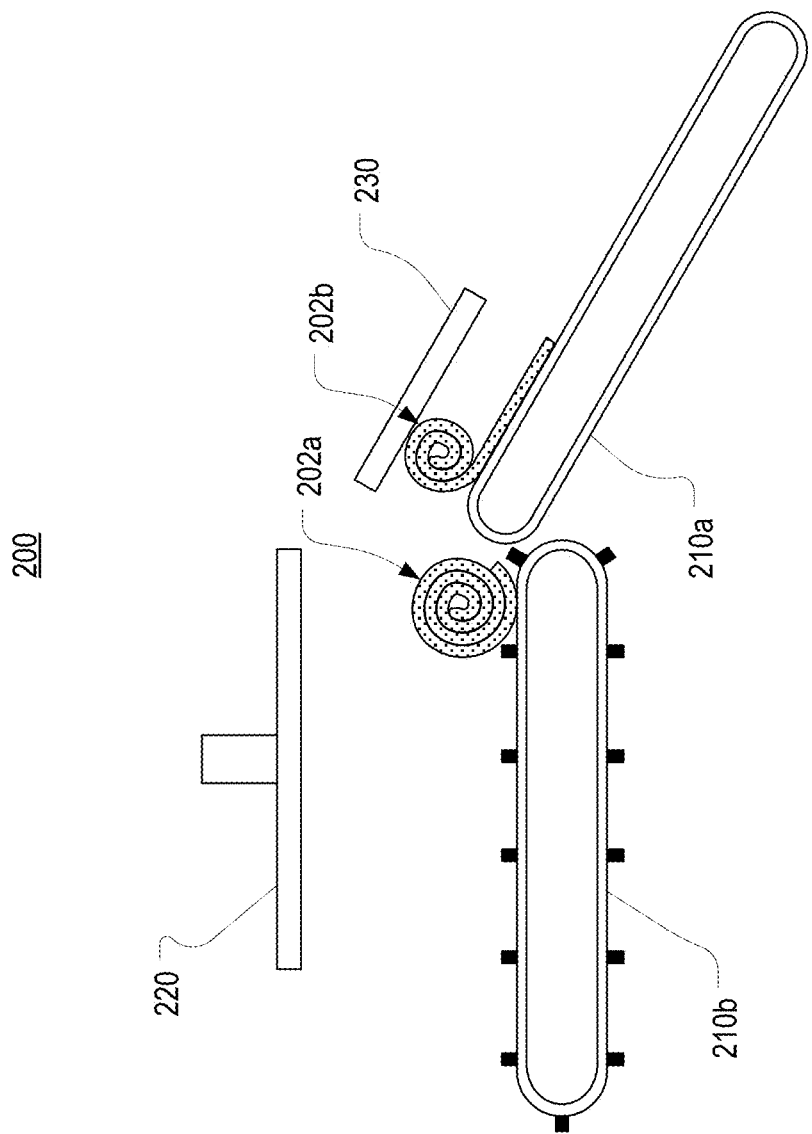

In contrast, in accordance with embodiments of the present invention, stacking head 220 can be movable with stacking conveyor 210b during a pick up operation, or in other words, while removing rolls 202 from stacking conveyor 210b. FIG. 2C illustrates an example of how stacking head 220 can be moved with stacking conveyor 210b prior to the removal of rolls 202 from stacking conveyor 210b. As shown in FIG. 2C, stacking head 220 has not yet removed rolls 202 from stacking conveyor 210b. However, both stacking head 220 and stacking conveyor 210b have been moved backwards sufficiently to create a spot on stacking conveyor 210b for the next roll 202a. In this way, there is no need to stop or slow sod harvester 202 (or inclined conveyor 210a) because the next roll 202a can be advanced even before stacking head 220 has removed the four rolls 202 from stacking conveyor 210b.

The movement of stacking head 220 with stacking conveyor 210b should be construed as encompassing any movement of the stacking head in the same direction as the movement of the stacking conveyor whether or not the movement occurs at the same time. For example, if stacking head 220 has not yet descended to pick up the rolls 220 (or at least has not attempted to secure them), the movement of the two components could occur out of sync (i.e. one component may move prior to the other or at a different rate than the other). Also, the distance moved by each component need not necessarily be identical. However, in preferred embodiments, the distance moved by each component will be substantially equal so that the pick-up or securing operation can be implemented in the same manner when the components are moved as would be implemented if the components were not moved.

Synchronized movement of stacking head 220 and stacking conveyor 210b can be preferred in many implementations. Because stacking head 220 can be moved in sync with stacking conveyor 210b, stacking conveyor 210b can be advanced without damaging the rolls 202. For example, if it were determined that stacking conveyor 210b needed to be advanced to make room for the next roll 202a, stacking conveyor 210b could be advanced regardless of whether stacking head 220 has secured the rolls 202. More particularly, in some embodiments, stacking head 220 can be configured to advance in sync with stacking conveyor 210b so that there is little or no relative movement between stacking head 220 and stacking conveyor 210b. Because there is little or no relative movement between these two components, there is little likelihood that the movement will cause any damage to rolls 202.

In some implementations of the present invention, stacking head 220 can be configured to move with stacking conveyor 210*b* anytime it is necessary to advance stacking conveyor 210*b* before stacking head 220 has removed the rolls 202 from stacking conveyor 210*b*. In such implementations, if stacking head 220 removes the rolls 202 before the next roll 202*a* is ready to be advanced onto stacking conveyor 210*b*, stacking head 220 would not be moved with stacking conveyor 210*b*. Accordingly, a sod harvester can move the stacking head with the stacking conveyor only when it would otherwise become necessary to stop or slow the sod harvester.

In other implementations, a sod harvester may be configured to move the stacking head with the stacking conveyor whether or not it would be necessary to advance the stacking conveyor to prevent the stopping or slowing of the sod harvester. For example, a sod harvester may be configured to move the stacking head with the stacking conveyor each time rolls are to be picked up. In short, the particular reason for moving the stacking head with the stacking conveyor should not limit the present invention, and the present invention should be construed as encompassing any movement of the stacking head with the stacking conveyor during a pick up operation.

FIGS. 3A-3D illustrate a series of top views of sod harvester 200 during two pick up operations. In each figure, stacking conveyor 210*b* and a pallet 301 are shown with stacking head 220 moving between various positions overtop the stacking conveyor and the pallet. FIG. 3A represents a first position of stacking head 220. The first position corresponds to the position of stacking head 220 in FIG. 2A. Accordingly, the first position represents the position of stacking head 220 either prior to or during pick up of the rolls 220 when stacking head 220 and stacking conveyor 210*b* are not advanced. FIG. 3B illustrates that stacking head 220 has been moved to a second position overtop pallet 301. This second position generally represents any position over pallet 301 and typically will not be the same identical position each time sod is stacked. For example, a stacking head similar to the one described in the '418 application, which is incorporated by reference, may be movable in an x, y, and r axis to enable stacking of sod on pallet 301 in various positions and directions.

FIG. 3C illustrates that stacking head 220 has been moved backwards with stacking conveyor 210*b* to a third position. The third position corresponds to the position of stacking head 220 in FIG. 2C. Accordingly, the third position represents the position of stacking head 220 when stacking head 220 is moved with stacking conveyor 210*b* during a pick up operation. Finally, FIG. 3D illustrates that stacking head 220 has been moved back to the second position overtop pallet 301. In typical operation, after stacking the sod from this position as represented in FIG. 3D, stacking head 220 would return to the first position shown in FIG. 3A to await the next set of rolls for stacking.

Although the above description has referred primarily to roll harvesters, the techniques of the present invention can equally be employed on slab harvesters. For example, if a number of slabs are accumulated on the stacking conveyor prior to the stacking head removing the slabs (e.g. in a manner similar to what is described in the '402 application), it may be necessary to advance the accumulated slabs to allow a following slab to be advanced onto the stacking conveyor (e.g. to make room for the following slab or to otherwise advance the following slab onto the stacking conveyor). In such cases, the stacking head and stacking conveyor can both be moved in the same direction during a pick up operation. Accordingly the present invention extends to moving the stacking head with the stacking conveyor during a pick up operation regardless of whether the harvesting machine produces rolls or slabs.

In any of the above described embodiments, the movement (including whether to move, how far to move, how quickly to move, etc.) can be controlled using various combinations of hardware and/or software. For example, with respect to the movement of stacking head 220 with stacking conveyor 210*b*, one or more sensors can be employed to determine when it is necessary to advance the next roll 202*a* onto stacking conveyor 210*b*. One or more sensors may also be used to detect the state of stacking head 220 (e.g. whether the stacking head has secured the rolls). Based on input from these sensors, a control unit may generate a signal for causing stacking head 220 and stacking conveyor 210*b* to be moved together to allow the next roll 202*a* to be advanced.

Similarly, with respect to the movement of stacking head 420 with stacking conveyor 410*b*, one or more sensors could be employed to detect a state of stacking head 420 (e.g. a position of the stacking head) and a state of stacking conveyor 410*b* (e.g. a speed at which the stacking conveyor is advancing slabs for pick up). A control unit can be configured to process input from such sensors and generate appropriate control signals for moving stacking head 420 an appropriate distance backwards.

Of course, these are only examples of how a combination of software and/or hardware can be employed to carry out the techniques of the present invention. One of skill in the art would understand that there are many different ways to implement hardware and/or software for appropriately controlling the movement of the stacking head during a pick up operation as described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. A sod harvester comprising:
   One or more inclined conveyors configured to continuously rotate to transport slabs of sod cut from the ground to a stacking conveyor;
   the stacking conveyor configured to rotate in a first direction to advance the slabs of sod onto the stacking conveyor, wherein, for each of the slabs of sod, the stacking conveyor rotates a specified distance in the first direction to advance the slab onto the stacking conveyor;
   a stacking head configured to remove accumulated sets of slabs of sod from the stacking conveyor as part of a pick up operation, the stacking head being configured to remove an accumulated set while the stacking head is in a first position that is a first distance from a leading edge of the stacking conveyor or while the stacking head is in a second position that is a second distance from the leading edge of the stacking conveyor, the second distance being greater than the first distance;
   one or more sensors for identifying when a subsequent slab is to be advanced from the one or more inclined conveyors onto the stacking conveyor; and
   a controller in communication with the one or more sensors, the controller being configured to control the stacking head to selectively cause the stacking head to remove an accumulated set in either the first position or the second position such that:

when the accumulated set is at the first position and the one or more sensors identify that the subsequent slab is to be advanced from the one or more inclined conveyors onto the stacking conveyor, the controller causes the stacking head to move in the first direction to the second position to thereby remove the accumulated set from the second position; whereas when the accumulated set is at the first position and the one or more sensors do not identify that the subsequent slab is to be advanced from the one or more inclined conveyors onto the stacking conveyor, the controller causes the stacking head to remove the accumulated set from the first position.

2. The sod harvester of claim 1, further comprising:
a roll mechanism that forms the slabs of sod into rolls prior to the rolls being advanced onto the stacking conveyor.

3. The sod harvester of claim 1, wherein the stacking conveyor stops after rotating the specified distance in the first direction to advance each slab onto the stacking conveyor.

4. The sod harvester of claim 3, wherein the difference between the second distance and the first distance is substantially the same as the specified distance.

5. The sod harvester of claim 2, wherein the specified distance corresponds to the size of the rolls.

6. The sod harvester of claim 3, wherein the stacking conveyor stops while the stacking head removes the accumulated sets from the second position.

7. The sod harvester of claim 1, wherein the pick up operation comprises moving the stacking head from a stacking position towards the stacking conveyor, and wherein the stacking head moves in the first direction prior to, during, of after movement of the stacking head towards the stacking conveyor.

8. The sod harvester of claim 4, wherein the stacking head is positioned in the first position prior to moving to the second position, and wherein the stacking conveyor is rotated the specified distance and the stacking head is moved in the first direction at substantially the same rate.

9. The sod harvester of claim 1, wherein the set of slabs comprises at least three slabs.

10. The sod harvester of claim 1, wherein the stacking head moves in the first direction while securing the accumulated set.

11. The sod harvester of claim 10, wherein the slabs are rolls.

12. The sod harvester of claim 1, wherein the stacking head is moved in the first direction while travelling from a stacking position towards the stacking conveyor.

13. The sod harvester of claim 12, wherein the stacking position is a first stacking position of a plurality of different stacking positions, the first stacking position being farther away from the stacking conveyor than at least one of the plurality of different stacking positions.

14. The sod harvester of claim 1, wherein the stacking head moves in the first direction prior to securing the accumulated set.

15. The sod harvester of claim 1, wherein the stacking head secures the accumulated set while in the first position and then moves in the first direction.

16. A sod harvester comprising:
one or more inclined conveyors for elevating slabs of sod to a stacking conveyor, the one or more inclined conveyors being configured to continuously rotate to thereby advance the slabs to the stacking conveyor at a periodic rate;
a roll mechanism for converting the slabs of sod into rolls;
the stacking conveyor on which a plurality of rolls are accumulated for pick up, the stacking conveyor being configured to periodically advance a specified distance to receive a roll from the one or more inclined conveyors; and
the stacking head, the stacking head being configured to remove a plurality of rolls from the stacking conveyor when the stacking head is in either a first position or in a second position based on input from one or more sensors which identify when the one or more inclined conveyors will advance a subsequent roll onto the stacking conveyor, wherein the stacking head removes the plurality of rolls from the first position when it is determined that the plurality of rolls can be removed from the stacking conveyor before the one or more inclined conveyors advance the subsequent roll onto the stacking conveyor, whereas the stacking head moves to the second position to remove the plurality of rolls from the second position when it is determined that the plurality of rolls cannot be removed from the first position before the one or more inclined conveyors will advance a subsequent roll onto the stacking conveyor.

17. The sod harvester of claim 16, wherein the stacking head moves from the first position to the second position at substantially the same rate as the stacking conveyor advances the specified distance.

18. The sod harvester of claim 16, wherein the distance between the first position and the second position is substantially the same as the specified distance.

19. The sod harvester of claim 16, wherein the stacking head moves from the first position to the second position prior to securing the rolls.

20. The sod harvester of claim 16, wherein the stacking head moves from the first position to the second position while securing the rolls.

* * * * *